W. S. SMITH.
WEIGHING SCALE.
APPLICATION FILED DEC. 23, 1918.

1,396,668.

Patented Nov. 8, 1921.

Inventor
Walter S. Smith

By
C. C. Shepherd
Attorney

UNITED STATES PATENT OFFICE.

WALTER S. SMITH, OF COLUMBUS, OHIO, ASSIGNOR TO THE SMITH SCALE COMPANY, OF COLUMBUS, OHIO, A CORPORATION OF OHIO.

WEIGHING-SCALE.

1,396,668.      Specification of Letters Patent.      Patented Nov. 8, 1921.

Application filed December 23, 1918. Serial No. 267,926.

*To all whom it may concern:*

Be it known that WALTER S. SMITH, a citizen of the United States, residing at Columbus, in the county of Franklin and State of Ohio, has invented certain new and useful Improvements in Weighing-Scales, of which the following is a specification.

This invention is directed to an improvement in weighing scales and is designed particularly as an improvement in the existing structure of counter poise and scale bar in their relation with each other so that accidental movement of the poise on the bar under normal conditions is rendered impossible.

It will therefore be apparent that my invention is directed to that type of scale in which a weight indicating scale bar is resorted to and its main object is to guarantee the continuity of a set weight against accidental displacement. In packaging houses, it is frequently customary to set the counter poise in a given position and determine the weights of the succeeding weighings without necessarily checking up the position of the poise after each weight is completed and it is to guard against the accidental displacement of this poise that my invention is directed.

Figure 2:
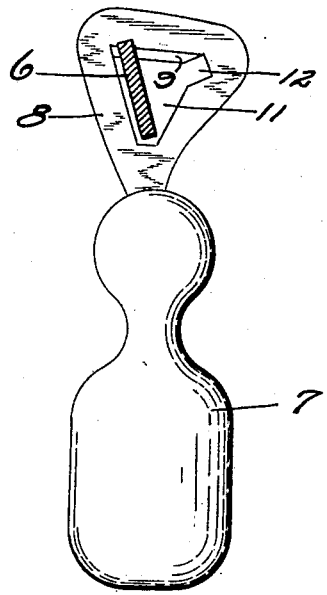
Figure 1:
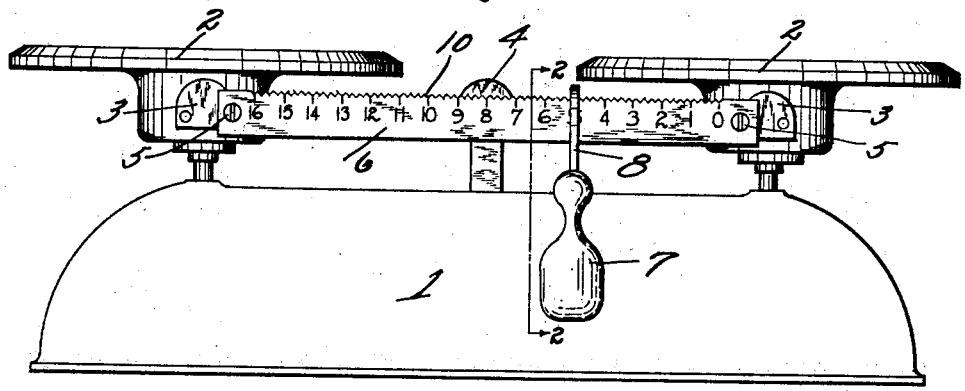

The preferred embodiment of my invention is shown in the accompanying sheet of drawings wherein similar characters of reference designate corresponding parts and wherein, Figure 1 shows an even balanced type of scale with which a scale bar is associated and showing my invention applied thereto, and Fig. 2 is a cross-section taken on line 2—2 of Fig. 1.

In the drawings, the scale body is designated generally by the reference numeral 1 and the pans by the numeral 2. It will be understood that these pans are operatively mounted at 3 in connection with any preferred type of beam which latter is fulcrumed at 4 from the body 1. Attached to the beam by means of the screws 5 is a scale bar 6 shown in the present instance as being divided to indicate ounce measurements. Associated with the scale bar is a counter poise 7 of the proper weight which carries a poise hook 8 at its upper end. This poise hook is formed with a knife edge 9 adapted to set in the serrations 10 formed on the upper edge of the scale bar and the height of the effective opening 11 in this poise hook is less than the effective height of the scale bar, both measurements being taken when the bars are in their normal weighing positions such as shown for instance in Fig. 2. Under these conditions, accidental displacement or shifting of the poise hook to anything but the set position is impossible. However, its free movement has been provided for by means of the supplemental notch or cut out portion shown at 12 which is arranged so that the effective opening created when the poise is moved upwardly and toward the right of Fig. 2 about the scale bar as a center is greater than the height of the scale bar. However, such position for the poise is an abnormal one and the poise consequently will only assume such position when moved thereto by the operator. In this latter position, however, the poise may again be set wherever desired.

From the foregoing description, taken in connection with the accompanying drawings, it will be apparent that because the effective height of the opening 11 in the scale hook is less than that of the scale bar, accidental displacement of the poise in connection with the scale bar is impossible. However, by swinging the poise to an abnormal position to permit the notch 12 to come into play, movement of such poise to any desired position is rendered possible.

What I claim is:

1. In a weighing scale, a scale bar, a poise and a poise hook carried thereby and adapted to be suspended from said bar being provided with notches on one edge, said bar and said hook being shaped to interlock with said notches and at the same time engage the opposite edge of the bar when the hook is in normally suspended position on the bar to prevent movement thereon but permitting movement when the hook is moved to abnormal position.

2. In a weighing scale, a scale bar, a poise and a poise hook carried thereby and adapted to be suspended from said bar, the width of said bar being greater than the corresponding width of the opening in said hook to prevent movement of the hook on the bar, the lateral effective opening in said hook being greater than the width of said bar to permit movement of the hook on the bar.

In testimony whereof I affix my signature.

WALTER S. SMITH.